COLLAPSIBLE PACKER APPARATUS FOR SEALING PIPE LEAKS

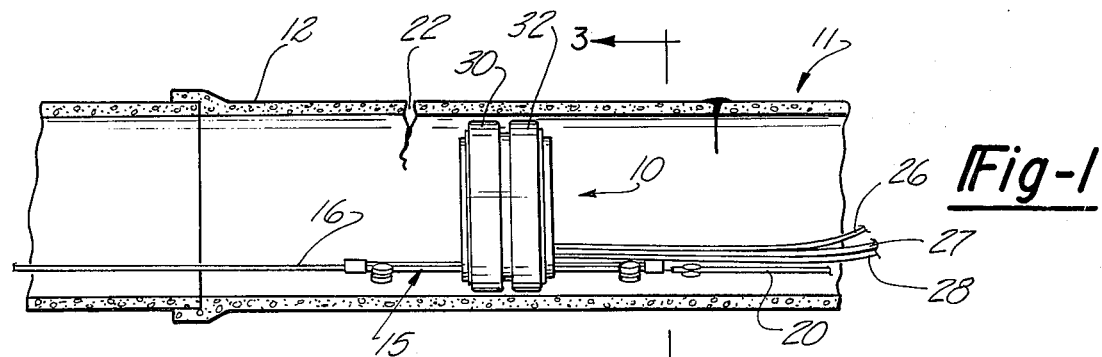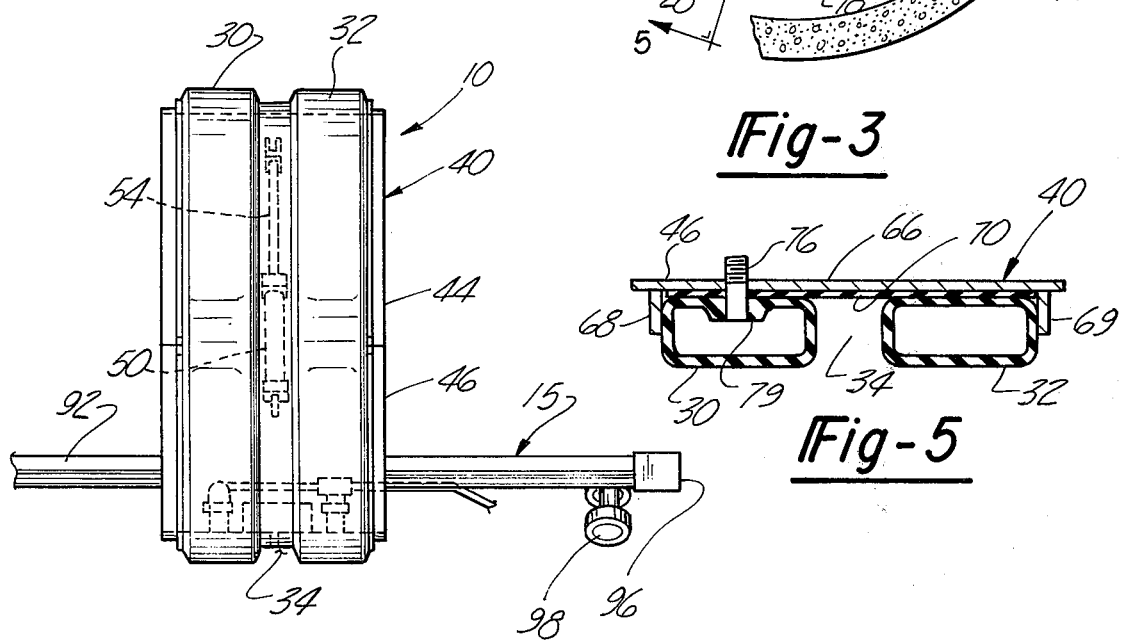

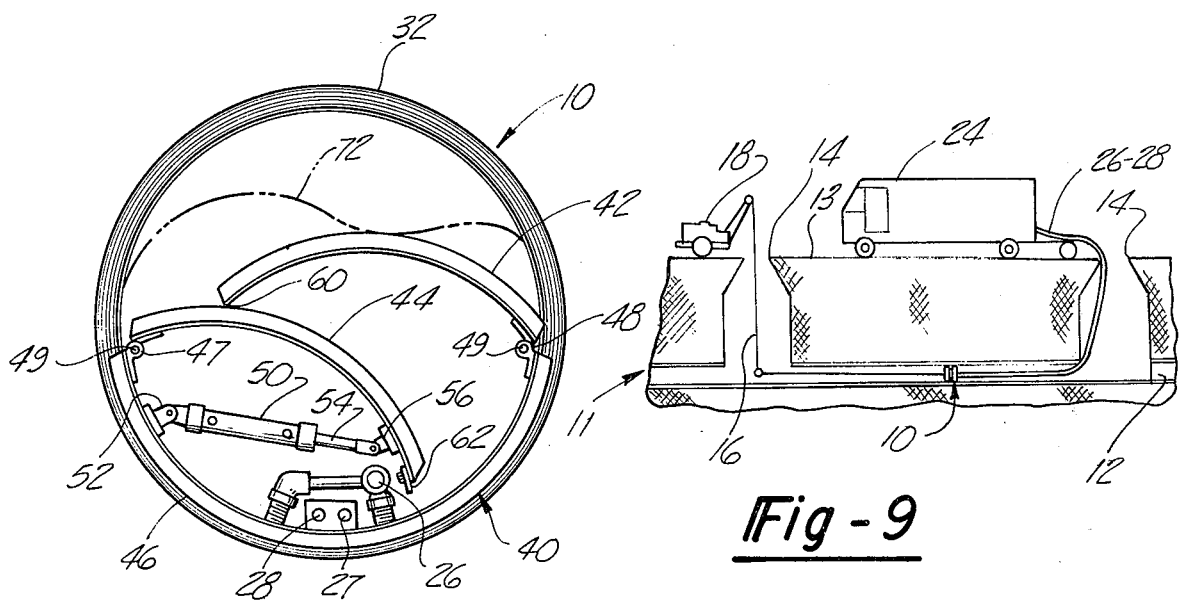
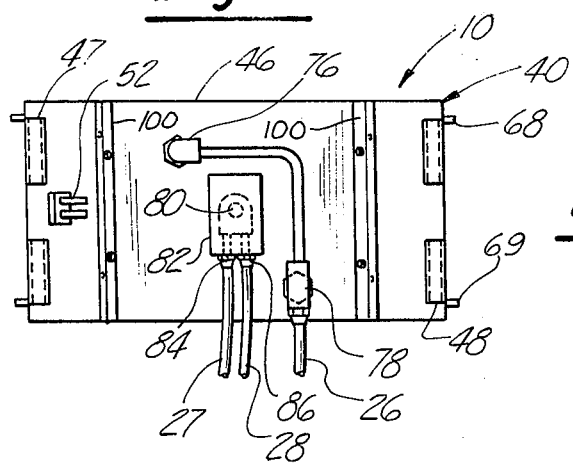
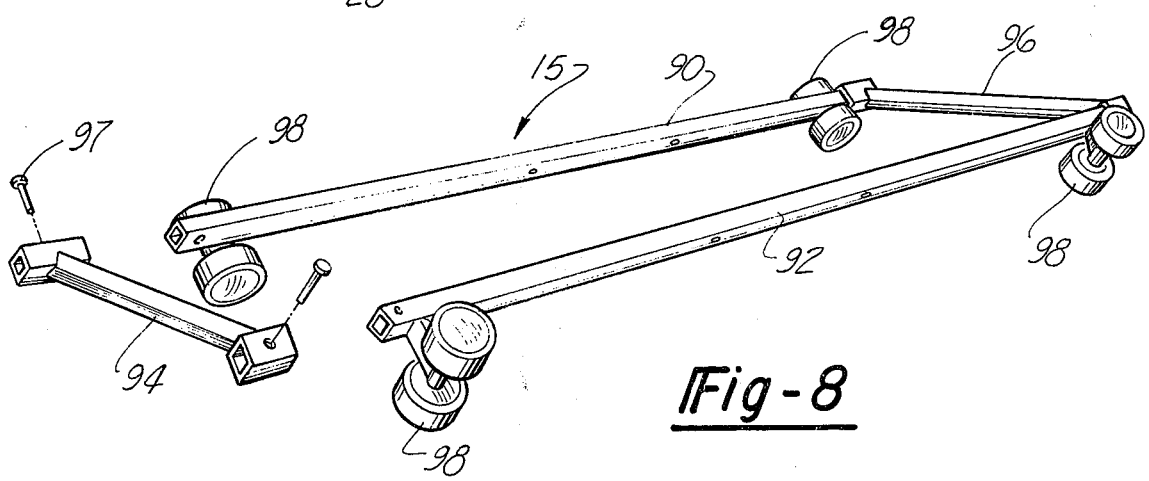

BACKGROUND OF THE INVENTION

1. Field of the Invention

The present invention relates to an apparatus for injecting fluid, the viscosity of which tends to increase with the passage of time, into a passage opening for the purpose of repairing and sealing joints and fractures of portions of subsurface conduit sections; and, in particular, the present invention relates to a collapsible packer for the sealing of such subsurface conduit sections.

2. Description of the Prior Art

In subsurface conduits such as sewer lines, it is frequently necessary to reseal joints through which leakage is taking place or to seal other fractures in the sewer line.

Prior to the development of television cameras and internal pipe sealing units, the repair of subterranean pipe lines to correct the infiltration of water and the egress of sewage has consisted of calculating strategic locations of infiltration and then excavating along the pipe line until the leak was located and the repair made. Such a method was obviously very time consuming and extremely expensive in the correction of such sewage lines and it is obviously very difficult to locate the exact cite of the leak in a pipe. This resulted in the employment of television cameras and the like for the purpose of locating such repairs and for the purpose of facilitating the actual repair. Numerous examples exist in the prior art of systems that have been employed for the purpose of repairing such subterranean lines as well as other examples of related apparatus which are employed in the repair of subterranean gas lines and the like. These include but are not limited to U.S. Pat. Nos. 2,894,539, 3,103,235, 3,144,880, 3,168,908, 3,168,909, 3,269,421, 3,606,913 and 3,618,639.

While each of the above mentioned patents within the sphere of its desired use functions in an acceptable manner they do not overcome a basic problem in the repair of sewers having an internal diameter in excess of 24 inches. To date, such sewers are repaired by means of a workman entering the sewer and visually locating the leak and manually repairing the same. Such manual methods of repairing such sewers are extremely time consuming and expensive. The primary reason for the need for manual labor in the repair of such sewers is that none of the equipment disclosed in the aforementioned prior patents can be inserted through the same sewer manhole since the manhole entrances do not exceed 24 inches in diameter. In order for such prior art packers to be used in larger diameter sewer lines the packers must be in excess of 24 inches, and thus such packers are not usable unless the cone section of the manhold is excavated. Since the expense of such excavation does not warrant the use of such equipment, it is the customary operating procedure for a workman to be employed.

In addition to the aforementioned difficulty that would be encountered when using the prior art packers, sewer lines may be smaller than standard size, have protruding objects or be out of round, that is of an oval shape. Thus, it is necessary that a packer not only be collapsible for purposes of facilitating passage of the packer through the manhole, but that such collapsibility be accomplished quickly and simply.

SUMMARY OF THE INVENTION

The present invention which will be described subsequently in greater detail comprises a collapsible packer for sealing pipe leaks in which the packer is fabricated from an inwardly, collapsible cylindrically shaped body and has means for facilitating such collapsible and expansible capability.

It is therefore an object of the present invention to provide a new and improved collapsible packer apparatus for fast jelling grouts such that the packer may be inserted through a standard size manhole into a sewer line and easily expanded to an operating condition within the sewer line.

It is still a further object of the present invention to provide a packer apparatus for sealing pipe leaks of the aforementioned collapsible type which is simple in design and therefore relatively simple to use and inexpensive to fabricate.

Other objects, advantages and applications of the present invention will become apparent to those skilled in the art of packer apparatus for sealing subterranean pipes and the like when the accompanying description of one example of the best mode contemplated for practicing the invention is read.

BRIEF DESCRIPTION OF THE DRAWINGS

The description herein makes reference to the accompanying drawings wherein like reference numerals refer to like components throughout the several views, and in which:

FIG. 6 is a view of the packer apparatus similar to the view of FIG. 3 with the packer apparatus being shown in a partially collapsed position;

FIG. 7 is a fragmentary cross sectional view of the packer apparatus taken along line 7—7 of FIG. 3;

FIG. 8 is a partially exploded perspective view of the sled on which the packer apparatus of the aforementioned figures is carried through the subterranean pipe; and FIG. 9 is a schematic representation of one example of the manner in which the packer apparatus and sled of the aforementioned figures is utilized.

DESCRIPTION OF THE PREFERRED EMBODIMENT

Figure 1:
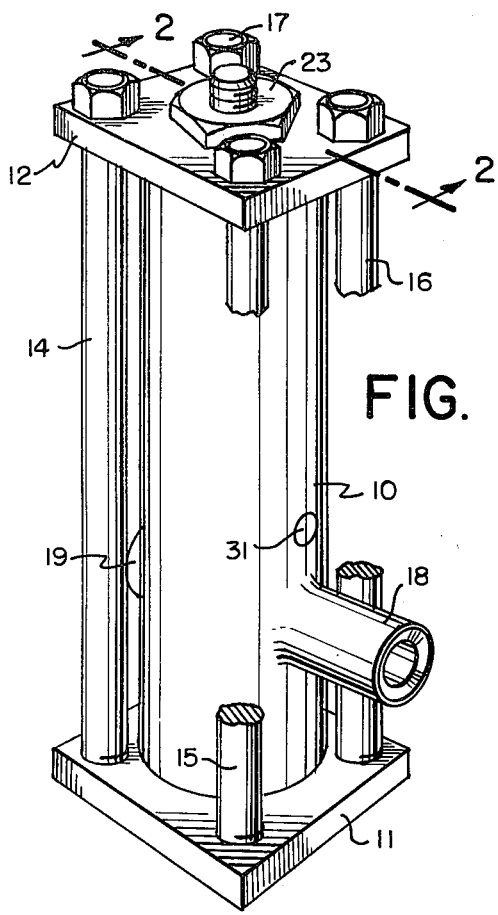
FIG. 1 is a fragmentary longitudinal sectional view through a subterranean pipe, such as a sewer line, illustrating a packer apparatus fabricated in accordance with the principles of the present invention.
Figure 2:
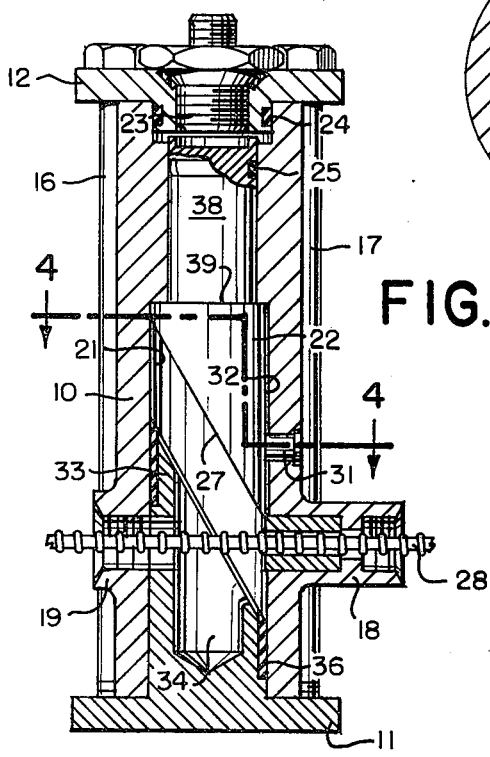
FIG. 2 is a view similar to FIG. 1 illustrating the packer apparatus in a grouting mode.

Referring now to the drawings and, in particular, to FIGS. 1, 2 and 9 where there is illustrated one example of the present invention in the form of a packer apparatus 10 in position within the interior of a subterranean pipe, such as a sewer line 11. As can best be seen in FIG. 9 the conventional sewer line 11 comprises a conduit 12 disposed below the ground level 13 at a predetermined depth which is determined by the particular location of the sewer conduit 12. At predetermined locations along the longitudinal length of the sewer line 11 accesses such as conventional manholes 14 are provided to facilitate entry into the sewer line. The packer apparatus 10 is positioned within the sewer line 11 by passing the same through the manhole 14. As will be described hereinafter the packer apparatus 10 is collapsed into a configuration which permits it to be partially disassembled and passed through the conventional manhole 14 having a diameter of no more than 24 inches and lowered into the sewer conduit 12 whereupon a workman may expand the same to a working position. In its working position, as illustrated in FIG. 1, the packer apparatus 10 is carried on a sled 15, which is utilized for the purpose of facilitating the movement of the packer apparatus 10 through the sewer conduit 12. Actual movement of the packer apparatus 10 is accomplished by means of a line 16 which is connected to a winch 18 at a downstream manhole entry. To the right of the sled 15, as illustrated in FIG. 1, there is provided a second sled 20 on which a workman rides through the sewer conduit 12 with the packer apparatus 10 for the purpose of locating leaks and for positioning the packer apparatus 10 with respect to a crack such as at 22 for the purpose of sealing the crack 22 in a manner which will be described hereinafter. At the surface, a suitable vehicle such as truck 24 is provided with the grouting material and a pressurized system as is necessary to perform the function to be described hereinafter. The grouting fluid and pneumatic pressure required is piped to the packer apparatus 10 through suitable lines 26, 27 and 28 all of which will be described in much greater detail hereinafter.

After the workman has assembled the packer apparatus 10 to its expanded operational position, the cable 16 is utilized to draw the packer apparatus 10 through the sewer conduit 12 and at the same time carry the workman on the sled 20. As the packer apparatus 10 is moved through the sewer conduit 12, the workman will be able to view the interior wall of the sewer conduit 12 for leaks and where appropriate, the packer apparatus 10 may be aligned with the crack 22 to eject a grouting solution into the crack 22 and seal the same such as illustrated in FIG. 2.

As will also be described in greater detail hereinafter the packing apparatus 10 includes a pair of axially spaced, inflatable tubes 30 and 32 which when inflated by compressed air or the like expand such that their outer peripheral surfaces contact the inner wall of the sewer conduit 12 and create a seal thereinbetween such that the inner surface of the sewer wall, the opposing inner surfaces of the inflatable tubes 30 and 32 and the inner wall of the packer apparatus 10 define a confined annular space 34 through which the grouting fluid may be injected under pressure and through which the same may pass into the crack 22 to seal the same. After the crack 22 has been sealed in the manner aforementioned, the tubes 30 and 32 are deflated, and the packer apparatus 10 along with the workman on the sled 20 is moved along the sewer conduit 12 with the packer apparatus 10 riding on wheels provided on each of the sleds 15 and 20 as will be described hereinafter.

Figure 3:
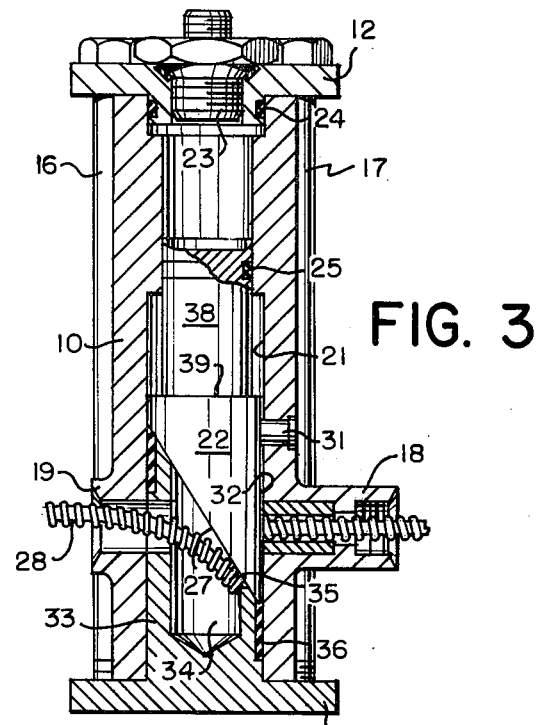
FIG. 3 is a fragmentary cross sectional view of the pipe viewing the packer apparatus from line 3—3 of FIG. 1.
Figure 4:
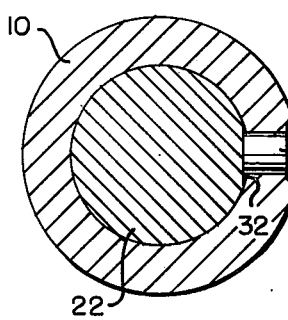
FIG. 4 is an enlarged side elevational view of the packer apparatus as seen in FIG. 1.

As can best be seen in FIGS. 3 through 7, the packer apparatus 10 comprises a generally cylindrically shaped body 40 having three arcuate body portions 42, 44 and 46. The arcuate portion 46, as can best be seen in FIGS. 3 and 7, is normally adapted to be disposed along the bottom wall of the sewer conduit 12. The arcuate body portion 46 has end hinges 47 and 48 at its opposite ends which, respectively, pivotally mount the arcuate portions 44 and 42 by means of removable pins 49. The hinges 47 and 48 permit the arcuate body portions 42 and 44 to be pivoted from an expanded position as shown in FIG. 3 to a collapsed position as shown in FIG. 6 wherein the arcuate body portions 42 and 44 are radially inwardly collapsed toward the lower arcuate body portion 46 wherein the pins 49 may be removed to permit the arcuate portions 42 and 44 to be separated from the arcuate portion 46 to facilitate the insertion of the packer through a manhole. Expansion and collapse of the packer apparatus 10 is facilitated by means of a pneumatically operated cylinder 50 which has one end pivotally attached by bracket 52 to one side of the lower arcuate body portion 46, while its connecting rod 54 is pivotally attached to the upper end of the arcuate body portion 44 by any suitable means such as bracket 56 and a removable pin 55. The cylinder 50 is conventional in its construction having a piston (not shown) reciprocally mounted therein and which, in turn, is connected to the inner end of the connecting rod 54. When fluid pressure is communicated through a port 57 by any suitable fluid conduit (not shown), pressure is exerted against the piston to expand the cylinder 50, and thus, rotate the arcuate body portion 44 in a counter-clockwise direction as viewed in FIGS. 3 and 6. In a similar manner, when fluid pressure is directed to a cylinder port 58 pressure fluid acts against the piston to retract the connecting rod 54 thereby pivoting the arcuate body portion 44 in a clockwise direction about the hinge 47 and causing a collapse of the packer apparatus 10 to the position illustrated in FIG. 6.

During the initial expansion of the packer apparatus 10 from its collapsed position the arcuate body portion 42 is automatically raised to its expanded position by the sliding engagement of the extended end 60 (FIG. 6) against the outer surface of the arcuate body portion 44. This engagement between the two arcuate body portions brings the portion 42 to a nearly raised position until the bottom surface of the arcuate body portion 42 is engaged by a locking flange 62 carried at the outermost end of the arcuate body portion 44 (FIG. 6). The locking flange 62 thus provides a dual function in that the same engages the underside of the arcuate body portion 42 to bring it to its final expanded position, while at the same time this engagement limits the outward movement of the body portion 44 under the force of the expanding cylinder 50. A cam section 61 at the end of the arcuate body portion 44 facilitates the passage of the end of the portion 44 into an abutting engagement with the end of the arcuate body portion 42. The packer apparatus 10 is retained in its expanded position by maintaining a force of pressure on the cylinder 50 as well as by an interlocking effect that is obtained by the aforementioned abutting engagement of the ends of the arcuate body portions 42 and 44.

Figure 5:
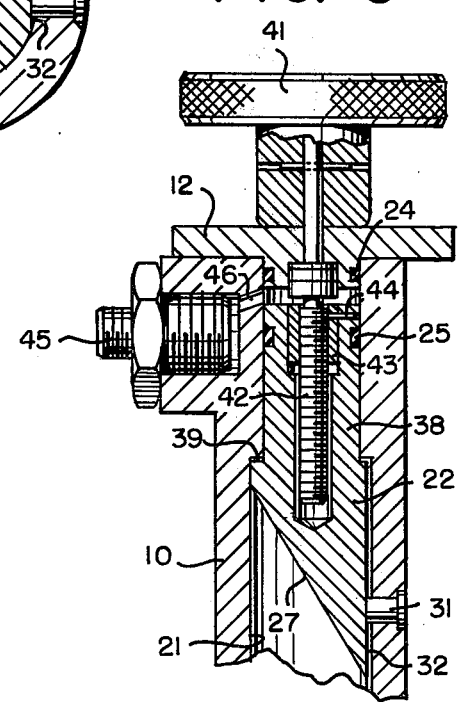
FIG. 5 is a fragmentary cross sectional view of the packer apparatus as taken along line 5—5 of FIG. 3.

As can best be seen in FIG. 5 the body portion, that is the pivotally connected arcuate body portions 42, 44 and 46, each have a generally U-shaped cross section in that they are provided with a base section 66 having radially extending flanges 68 and 69. The flanges 68 and 69 have disposed thereinbetween a sealing element such as a rubber ring 70 which, in turn, supports the aforementioned pair of inflatable tubes 30 and 32. The outer wall surfaces of the tubes 30 and 32 respectively abut the inside surfaces of the flange elements 68 and 69, and thus, are retained on the outer surface of the body 40 and properly axially spaced to define the annular space 34. During the expanded state of the apparatus 10 the tubes 30 and 32 and the rubber ring 70 are snugly held in position around the outer periphery of the body 40 while during the collapsed state of the packer apparatus 10 the rubber ring 70 and the tubes 30 and 32 collapse inwardly such as shown by the phantom line 72 in FIG. 6.

The aforementioned pneumatic line 26 is communicated to the inflatable tubes 30 and 32 by means of a pair of connected valves 76 and 78, the valve 76 being partially illustrated in cross section in FIG. 5. The valves 76 and 78 extend through suitable bores within the base 66 of the cylindrical body 40 for connection through a raised boss 79 or the like within the tubes 30 and 32. It can thus be seen that when air under pressure is communicated via the hose 26 to the valves 76 and 78, the tubes 30 and 32 will be expanded, and when the pressure is released the tubes 30 and 32 will retract. During the inflated stage, the tubes 30 and 32 expand a sufficient distance to engage the surface of a wall of the sewer conduit 12 to seal the same and create the confined annular space 34 in the manner aforementioned.

The grouting compound which is ejected into the annular space 34, and thus into the crack 22 to seal the same is communicated to this space by means of the grouting lines 27 and 28 which terminate in a mixing chamber 80 of the mixing valve 82 (FIG. 7). Suitable check valve 84 and 86 carried by the valve 82 at the ends respectively of the lines 27 and 28 prevent a back flow of the mixed grouting fluid into either one of the supply lines. The grouting fluids which are commercially available need not be described in any detail as the fluids do not relate specifically to the present invention to the extent that the fluids are commercially available and may be used in the manner described for the purposes of sealing the crack 22.

It should be noted that the extended end of the moveable arcuate body portion 44 has the aforementioned cam sections 61 formed on the flange portions 68 and 69 such that the cam sections engage the extended end 60 of the arcuate body portion 42 for the purpose of bringing the same to the raised position wherein the inner surface of the portion 42 abuttingly engages the locking plate 62 as aforementioned.

The packer apparatus 10 is carried within the sewer conduit 12 on the aforementioned sled 15 which as can best be seen in FIG. 8 comprises two parallel members 90 and 92 which are connected at their opposite ends by transverse members 94 and 96 by any suitable means such as fasteners 97. The elements of the sled 15 are fabricated so that the side and transverse members 90-96 may be easily assembled and disassembled to facilitate the removal of the packer apparatus 10 from the sewer conduit 12 as aforementioned. The longitudinal members 90 and 92 have at opposite ends suitable bearing wheels 98 which are suitably designed to carry the packer 10 through the sewer conduit 12. As can best be seen in FIGS. 3 and 8 the transverse members 94 and 96 are so attached to the longitudinal members 90 and 92 that the wheels 98 are disposed at an angle which is inclined with respect to the horizontal to permit the entire sled 15 to ride along the sewer walls and permit the packer apparatus 10 to remain somewhat concentric with respect to the wall of the sewer conduit 12.

The longitudinal members 90 and 92 are attached to the interior of the apparatus 10 by longitudinal rib members 100 (FIG. 7) which, in turn, are carried on the inner peripheral surface of the arcuate body portion 46.

It can thus be seen that the present invention provides a packer apparatus which is utilized for the injection of a fast setting chemical grout into portions of subterranean conduits with the packer apparatus being of such a construction that it may be inwardly collapsed to facilitate the insertion of the packer apparatus through conventionally sized 24 inch manholes while being expandable to a size which is substantially larger than the manhole; for example, packer apparatus fabricated in accordance with the principles of the present invention range from 25 inches in diameter or larger. Specifically, the packer 10 is collapsed in the aforementioned manner and the arcuate portions 42 and 44 are separated from the cylinder rod 54 and the arcuate portion 46 by removing the pins 49 and 55. The separated sections are passed through the manhold entrance 14 and reassembled in a quick and efficient manner inside the sewer conduit 12.

It can also be seen that the present invention provides a packer apparatus which may be utilized to inject a fast grouting chemical to seal cracks in subterranean pipes wherein the overall longitudinal length of the packer apparatus is substantially less than conventionally available packers as the present invention is designed to facilitate the carrying of a workman who can visually align the packer with the crack such that the same may be sealed quickly and efficiently.

It can also be seen that the present invention provides a packer apparatus for the injection of a fast setting chemical grout for the purpose of sealing cracks and joints in subterranean conduits which is extremely simple in its design, sturdy for its intended purpose of use, and one which in comparison to other commercially available packer apparatus is extremely inexpensive to manufacture.

It can also be seen that with the present invention subterranean conduits may be repaired because a fast setting grout may be quickly and efficiently ejected into cracks and joints of such conduits.

It can also be seen that since the several sections of the packer 10 are pivotally connected, the packer may be easily collapsed while it is being driven through the sewer conduit 12 such that the packer 10, which usually has from one to two inches in diametrical clearance with the sewer conduit wall, may easily be passed by the aforementioned obstacles and then quickly expanded to a working mode.

Although only one example of the present invention has been disclosed, it should be apparent to those skilled in the art of packer apparatus for sealing subterranean conduits that other forms may be had, all coming within the spirit of the present invention and scope of the appended claims.

What is claimed is as follows:

1. A packer apparatus for injecting a grouting fluid into an opening in a conduit wall, said packer apparatus comprising a collapsible body that is movable from a first expanded cylindrically shaped position to a second inwardly collapsed position;

a pair of axially spaced inflatable members carried by the outer surface of said body;

means for expanding said inflatable members such that said inflatable members cooperate with said conduit wall to define a confined annular space between said spaced inflatable members, said inflatable members being radially collapsible with said body when the same is in said second position; and means for directing under pressure a grouting fluid into said confined annular space.

2. The packer apparatus defined in claim 1 further comprising a sled on which said packer apparatus is mounted, said sled having wheels thereon so that said packer apparatus may be moved within said conduit on said wheeled sled.

3. The packer apparatus defined in claim 1 wherein said inflatable members are inflatable tubes carried on the outer periphery of said cylindrically shaped body and are pneumatically inflatable outwardly from said body a sufficient distance to cooperate with said conduit wall.

4. The packer apparatus defined in claim 2 further comprising a second wheeled sled of sufficient size and capacity to support the weight of a man, said second sled being attached to said packer apparatus such that as said packer apparatus is propelled through said conduit said second sled is carried thereby.

5. The packer apparatus defined in claim 1 wherein said collapsible body comprises at least three arcuate sections, two of which have ends that are pivotally attached to the opposite ends of the third arcuate section and movable toward and away from said third arcuate section as the other ends thereof pivot with respect to said third arcuate section; and means for engaging one of said movable sections and pivoting said one section end away from said third arcuate section toward the other of said movable section ends to bring said sections to said expanded cylindrically shaped position and maintaining said sections in said position.

6. The packer apparatus defined in claim 5 wherein said last mentioned means comprising a fluid operated cylinder having an extendable and restractable rod which is attached to said one arcuate section, said rod being extendable to move said one arcuate section to said expanded position and hold the same in said expanded position with the other of said pivoting arcuate sections; and said rod being retractable to pivot said one arcuate section toward said third arcuate section and cause said collapsible body to inwardly collapse to said second position.

7. The packer apparatus defined in claim 3 wherein said collapsible body is cylindrically shaped having a U-shaped cross section, the legs of said U-shaped cross section pointing radially outwardly and defining a channel therein between, said inflatable tubes being disposed on the outer peripheral surface of said U-shaped member between said legs and defining between the opposing surfaces of said inflatable tubes said confined annular space;

a fluid impervious material disposed between the bottom surfaces of said inflatable tubes and the outer surface of said channel; and means passing through said channel and said impervious material for connecting the interiors of said tubes to said means for expanding said tubes.

8. The packer apparatus defined in claim 7 wherein said inflatable tubes are disposed within said channel and are relatively closely spaced.

9. The packer apparatus defined in claim 7 further comprising a mixing chamber connected to the interior of said third arcuate section, said mixing chamber having means communicating the interior thereof to said confined annular space, and means for injecting separate fluid substances comprising said grouting fluid into said mixing chamber for forced mixing and ejection into said confined annular space; and means disposed within said last mentioned means to prevent back flow of said mixed fluid from said mixing chamber.

10. The packer apparatus defined in claim 5 further comprising means for releasably attaching said pivotally attached ends of said two movable arcuate sections to said third arcuate portion.

* * * * *

UNITED STATES PATENT AND TRADEMARK OFFICE
CERTIFICATE OF CORRECTION

PATENT NO. : 3,915,197
DATED : October 28, 1975
INVENTOR(S) : Theodore G. Piccirilli It is certified that error appears in the above-identified patent and that said Letters Patent are hereby corrected as shown below:

Page 1, line [76], after "Inventor:" delete "Theordore" and insert --Theodore--;

Column 7, Claim 6, line 3, after "and" delete "restractable" and insert --retractable--.

Signed and Sealed this twenty-third Day of March 1976

[SEAL]

Attest:

RUTH C. MASON
Attesting Officer

C. MARSHALL DANN
Commissioner of Patents and Trademarks